(12) United States Patent
Tsuda et al.

(10) Patent No.: US 10,947,377 B2
(45) Date of Patent: Mar. 16, 2021

(54) CHLORINE-CONTAINING RESIN COMPOSITION

(71) Applicant: Sakai Chemical Industry Co., Ltd., Sakai (JP)

(72) Inventors: Koichi Tsuda, Osaka (JP); Yasuhiro Tai, Osaka (JP); Toshihiro Nishii, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 213 days.

(21) Appl. No.: 16/305,789

(22) PCT Filed: Jul. 6, 2017

(86) PCT No.: PCT/JP2017/024839
§ 371 (c)(1),
(2) Date: Nov. 29, 2018

(87) PCT Pub. No.: WO2018/012403
PCT Pub. Date: Jan. 18, 2018

(65) Prior Publication Data
US 2020/0325322 A1 Oct. 15, 2020

(30) Foreign Application Priority Data
Jul. 14, 2016 (JP) .............................. JP2016-139478

(51) Int. Cl.
| C08L 27/06 | (2006.01) |
| C08K 3/26 | (2006.01) |
| C08K 5/07 | (2006.01) |
| C08K 5/12 | (2006.01) |
| C08K 5/09 | (2006.01) |
| C08K 5/098 | (2006.01) |

(52) U.S. Cl.
CPC ................ *C08L 27/06* (2013.01); *C08K 3/26* (2013.01); *C08K 5/07* (2013.01); *C08K 5/098* (2013.01); *C08K 5/12* (2013.01); C08K 2003/265 (2013.01); C08K 2201/019 (2013.01)

(58) Field of Classification Search
CPC .......... C08L 27/06; C08K 5/12; C08K 5/098; C08K 5/07; C08K 3/26; C08K 2003/265; C08K 2201/019
USPC ....................................................... 524/357
See application file for complete search history.

(56) References Cited

U.S. PATENT DOCUMENTS

| 6,140,401 A | 10/2000 | Wedl et al. |
| 6,313,208 B1* | 11/2001 | Nosu ......................... C08K 3/22 |
| | | 524/437 |
| 2007/0082978 A1* | 4/2007 | Suzuki ................... C04B 22/064 |
| | | 523/210 |
| 2011/0127066 A1 | 6/2011 | Baker et al. |
| 2011/0130496 A1 | 6/2011 | Shakir et al. |
| 2013/0041081 A1* | 2/2013 | Iwamoto ................ B82Y 30/00 |
| | | 524/148 |
| 2016/0017126 A1 | 1/2016 | Mitamura et al. |

FOREIGN PATENT DOCUMENTS

| EP | 06566344 | 6/1995 |
| EP | 2 471 862 | 7/2012 |
| JP | 2001-261907 | 9/2001 |
| JP | 2003-040614 | 2/2003 |
| JP | 2003040614 A * | 2/2003 |
| JP | 2009-263221 | 11/2009 |
| JP | 2011-068877 | 4/2011 |
| JP | 2013-533907 | 8/2013 |
| JP | 2015-000880 | 1/2015 |
| JP | 2016-053133 | 4/2016 |
| WO | 99/01509 | 1/1999 |
| WO | 2005/047184 | 5/2005 |
| WO | 2011/111487 | 9/2011 |
| WO | 2012/004377 | 1/2012 |
| WO | 2014/141608 | 9/2014 |

* cited by examiner

*Primary Examiner* — Michael Bernshteyn
(74) *Attorney, Agent, or Firm* — Hamre, Schumann, Mueller & Larson, P.C.

(57) ABSTRACT

The present invention provides a chlorine-containing resin composition capable of providing a processed product that is excellent in thermal stability and heat resistance and that has various excellent properties derived from the chlorine-containing resin in an efficient, easy, simple, and high-yield manner, without degrading the appearance of the processed product. The present invention also provides a method for providing such a processed product. The present invention relates to a chlorine-containing resin composition containing a chlorine-containing resin, a hydrotalcite powder, and organic acid zinc, wherein the hydrotalcite powder contains magnesium (Mg) and/or zinc (Zn), and aluminum (Al), the molar ratio of the total amount of magnesium and zinc to the amount of aluminum ((Mg+Zn)/Al) is 2.20 or less, and the hydrotalcite powder has an oil absorption of 30 ml/100 g or less.

5 Claims, No Drawings

CHLORINE-CONTAINING RESIN COMPOSITION

TECHNICAL FIELD

The present invention relates to chlorine-containing resin compositions.

BACKGROUND ART

Chlorine-containing resins such as polyvinyl chloride are highly flexible and easily processable, and also have properties such as flame retardancy. Thus, such resins are used in various applications such as agricultural films, electric wires, pipes, and resin window frames. Yet, the chlorine-containing resins, which unfortunately have poor thermal stability, are unstable to heat during processing or use, and degrade when heated. Thus, use of a chlorine-containing resin in combination with a stabilizer has been studied, and Patent Literature 1 suggests hydrotalcite as an exemplary stabilizer.

Meanwhile, hydrotalcite is also used as a heat retaining agent for agricultural films. For example, Patent Literature 2 discloses a hydrotalcite powder having an oil absorption in a predetermined range and an oil absorption/plate surface diameter ratio in a predetermined range. This hydrotalcite particulate powder has excellent heat retention properties and is useful as a heat retaining agent for agricultural films.

CITATION LIST

Patent Literature

Patent Literature 1: JP 2001-261907 A
Patent Literature 2: JP 2011-68877 A

SUMMARY OF INVENTION

Technical Problem

As described above, Patent Literature 1 suggests hydrotalcite as a stabilizer to be added to chlorine-containing resins. Yet, the inventors of the present invention found that when producing a product by processing (or molding) a resin composition containing a chlorine-containing resin and hydrotalcite, plate-out (a phenomenon in which a resin composition is deposited on a die, mold, cooling mold, or the like) occurs frequently. Although no plate-out is found for a while after processing has started, it occurs within a few minutes at the earliest, and then the amount of deposition increases over time. The occurrence of plate-out unfortunately degrades the appearance of the resulting product (e.g., reduced luster, occurrence of cracks and/or streaks) or physical properties (e.g., reduced impact strength). The occurrence of plate-out also causes problems in terms of facilities and workability because it requires washing of a die, mold, or cooling mold for removal of plated-out materials.

Patent Literature 2 describes mixing hydrotalcite with polyolefin resin to obtain a masterbatch. Yet, the processing time described in the examples is short (about five minutes), and Patent Literature 2 is silent about phenomena or problems associated with prolonged processing of a masterbatch. Patent Literature 2 is also silent about use of hydrotalcite in combination with a chlorine-containing resin, and is completely unaware of a problem that occurs when hydrotalcite is used in combination with a chlorine-containing resin.

There is also room for improvement to enhance thermal stability or heat resistance for use of hydrotalcite in combination with a chlorine-containing resin.

The present invention was made in view of the current situation described above, and aims to provide a chlorine-containing resin composition capable of providing a processed product that is excellent in thermal stability and heat resistance and that has various excellent properties derived from the chlorine-containing resin in an efficient, easy, simple, and high-yield manner, without degrading the appearance of the processed product. The present invention also aims to provide a method for providing such a processed product.

Solution to Problem

The present inventors found that while a resin composition containing a chlorine-containing resin, a hydrotalcite powder, and organic acid zinc is excellent in various physical properties including thermal stability, the resin composition sometimes exhibits plate-out during processing. As described above, the occurrence of plate-out degrades the appearance or physical properties of the processed product, and also requires washing of instruments or devices. The present inventors keenly examined the cause of plate-out, and found that constituent elements and oil absorption of a hydrotalcite powder are correlated to the occurrence of plate-out. They found that the occurrence of plate-out is sufficiently suppressed for a long time after processing has started by use of a hydrotalcite powder containing specific constituent elements and having an oil absorption in an amount equal to or less than a predetermined amount. They also found that use of such a hydrotalcite powder also prevents degradation of the appearance or physical properties, and enables high-yield production of an article (also referred to as a processed product or a product) that has a good color tone, transparency, and desired excellent physical properties. In addition, washing of a die, mold, or cooling mold, which is associated with the occurrence of plate-out, can be omitted or simplified. This improves product productivity, which is industrially advantageous. The present inventors also found that use of a particular hydrotalcite powder that contains specific elements at a predetermined ratio not only enables plate-out prevention but also increases heat resistance, thus providing a resin processed product capable of exhibiting better physical properties. Thus, the problems described above were successfully solved, and the present invention was completed.

Specifically, the present invention relates to a chlorine-containing resin composition containing a chlorine-containing resin, a hydrotalcite powder, and organic acid zinc, wherein the hydrotalcite powder contains magnesium (Mg) and/or zinc (Zn), and aluminum (Al), the molar ratio of the total amount of magnesium and zinc to the amount of aluminum ((Mg+Zn)/Al) is 2.20 or less, and the hydrotalcite powder has an oil absorption of 30 ml/100 g or less.

The present invention also relates to a chlorine-containing resin composition containing a chlorine-containing resin, a hydrotalcite powder, and organic acid zinc, wherein the hydrotalcite powder contains magnesium (Mg), zinc (Zn), and aluminum (Al), the molar ratio of the total amount of magnesium and zinc to the amount of aluminum ((Mg+Zn)/Al) is 2.20 or less, and the hydrotalcite powder has an oil absorption of 50 ml/100 g or less.

Preferably, the chlorine-containing resin composition contains 0.05 to 5 parts by mass of the hydrotalcite powder and 0.01 to 2 parts by mass of the organic acid zinc, relative to 100 parts by mass of the chlorine-containing resin. This enhances heat resistance and thermal stability, further prevents discoloration, and provides a better color tone, without degrading the appearance of the processed product.

The hydrotalcite powder is preferably represented by the following formula (1):

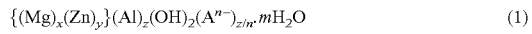

wherein $A^{n-}$ represents an n-valent interlayer anion; x, y, and z are numbers that satisfy $0<x<1$, $0\leq y<1$, $0.2\leq z\leq 0.4$, and $x+y+z=1$; the ratio of x+y to z, i.e., $(x+y)/z$, is 2.20 or less; and n and m are numbers that satisfy $1\leq n\leq 4$ and $0\leq m$, respectively. This enhances heat resistance and thermal stability.

Preferably, the chlorine-containing resin composition contains a plasticizer and stearoylbenzoylmethane or zinc dehydroacetate and does not contain dibenzoylmethane. Use of such a chlorine-containing resin composition as an electric wiring material (electric wire coating material) enables effective prevention of discoloration of copper wire surface that occurs by contact between an electric wire (copper wire) and the coating material.

The expression "does not contain dibenzoylmethane" means that the resin composition is substantially free of dibenzoylmethane. It means that the amount of dibenzoylmethane is 0.001% by mass or less relative to the total 100% by mass of the resin composition.

The present invention also relates to a method for producing a processed product, the method including a step of extruding the chlorine-containing resin composition by an extruder.

Advantageous Effects of Invention

Since the chlorine-containing resin composition of the present invention has features as described above, the resin composition can provide a processed product that is excellent in thermal stability and heat resistance and that has various excellent properties derived from the chlorine-containing resin in an efficient, easy, simple, and high-yield manner, without degrading the appearance of the processed product.

DESCRIPTION OF EMBODIMENTS

Preferred embodiments of the present invention are specifically described below. The present invention is not limited to these embodiments, and suitable modifications may be made without departing from the gist of the present invention.

(Chlorine-Containing Resin Composition)

The chlorine-containing resin composition of the present invention (also simply referred to as a "resin composition") contains a chlorine-containing resin, a hydrotalcite powder, and organic acid zinc. If necessary, the chlorine-containing resin composition may further contain one or more additional components. Each component may include one or more components. Each component is described below.

Chlorine-Containing Resin

The chlorine-containing resin is not particularly limited as long as it is a resin containing a chlorine atom (polymer), but a vinyl chloride resin is preferred to enable production of a processed product having excellent flexibility and flame retardancy.

Examples of the vinylchloride resin include homopolymers such as polyvinyl chloride, chlorinated polyvinyl chloride, polyvinylidene chloride, and chlorinated polyethylene; and copolymers such as vinyl chloride-vinyl acetate copolymers, vinyl chloride-ethylene-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-urethane copolymers, vinyl chloride-acrylic acid ester copolymers, vinyl chloride-styrene-maleic anhydride copolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate copolymers, vinyl chloride-maleic acid ester copolymers, vinyl chloride-methacrylic acid ester copolymers, vinyl chloride-acrylonitrile copolymers, and vinyl chloride-maleimide copolymers. A blended product of chlorine-containing resin and chlorine-free resin may also be used. The polymerization method to obtain the vinyl chloride resin is not particularly limited.

Hydrotalcite Powder

The hydrotalcite powder contains magnesium (Mg) and/or zinc (Zn), and aluminum (Al), and has an oil absorption of 30 ml/100 g or less; or the hydrotalcite powder contains magnesium (Mg), zinc (Zn), and aluminum (Al), and has an oil absorption of 50 ml/100 g or less. With the hydrotalcite powder having an oil absorption in the above range depending on the types of elements constituting the hydrotalcite powder, the present invention can sufficiently exhibit its effects described above. When the hydrotalcite powder contains magnesium (Mg), zinc (Zn), and aluminum (Al), the oil absorption is preferably 45 ml/100 g or less, more preferably 40 ml/100 g or less. The oil absorption is still more preferably 30 ml/100 g or less.

In terms of heat resistance, the lower limit of the oil absorption is preferably at least 5 ml/100 g, more preferably at least 10 ml/100 g, regardless of the types of elements constituting the hydrotalcite powder.

Herein, the oil absorption of the hydrotalcite powder is measured in accordance with JIS K 5101-13-1 (2004: Refined linseed oil method).

The hydrotalcite powder contains magnesium (Mg) and/or zinc (Zn), and aluminum (Al). The molar ratio of the total amount of magnesium and zinc to the amount of aluminum (Mg+Zn)/Al) is 2.20 or less. This enhances the thermal stability and the heat resistance of the processed product, and can also sufficiently prevent the occurrence of plate-out due to synergy with the oil absorption being in the above range.

The molar ratio ((Mg+Zn)/Al) is preferably 2.15 or less, more preferably 2.10 or less, still more preferably 2.05 or less. The lower limit is not particularly limited, but it is preferably 1.9 or higher, more preferably 2.0 or higher.

The hydrotalcite powder is particularly preferably represented by the following formula (1):

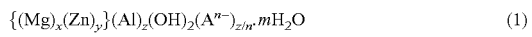

wherein $A^{n-}$ represents an n-valent interlayer anion; x, y, and z are numbers that satisfy $0<x<1$, $0\leq y<1$, $0.2\leq z\leq 0.4$, and $x+y+z=1$; the ratio of x+y to z, i.e., $(x+y)/z$, is 2.20 or less; and n and m are numbers that satisfy $1\leq n\leq 4$ and $0\leq m$, respectively. This enhances heat resistance and thermal stability.

In the formula (1), the n-valent interlayer anion is not particularly limited. Yet, in view of reactivity and environmental load reduction, the n-valent interlayer anion is preferably at least one selected from the group consisting of a hydroxide ion ($OH^-$), a carbonate ion ($CO_3^{2-}$), and a sulfate ion ($SO_4^{2-}$). A carbonate ion is particularly preferred among these.

The letters x, y, and z are numbers that satisfy 0<x<1, 0≤y<1, 0.2≤z≤0.4, and x+y+z=1, and the ratio of x+y to z, i.e., (x+y)/z, is 2.20 or less.

Here, the hydrotalcite in which y=0 is referred to as Mg/Al hydrotalcite, and the hydrotalcite in which 0<y is referred to as zinc-modified hydrotalcite. Either of these can be suitably used in the present invention. When using the zinc-modified hydrotalcite, y preferably satisfies 0.01≤y<1.

The ratio of x+y to z, i.e., (x+y)/z, is preferably 2.15 or less, more preferably 2.10 or less, still more preferably 2.05 or less. The lower limit is not particularly limited, but it is preferably at least 1.9, more preferably at least 2.0.

The letter n is a number that satisfies 1 n 4, and the number can be suitably adjusted depending on the valence of the interlayer anion. Preferably, n is an integer of 1 to 3, with 2 being more preferred.

The shape of particles of the hydrotalcite powder is not particularly limited. Examples include tabular, spherical, and discoidal shapes. Among these, tabular and discoidal shapes are preferred.

The shape of the particles can be observed with a scanning electron microscope or the like.

The average particle size of the hydrotalcite powder is preferably 0.1 μm or more and 2.0 μm or less, for example. This improves dispersibility of the hydrotalcite powder in the chlorine-containing resin, further improving the effects of the present invention. The average particle size is more preferably 0.3 μm or more, and is more preferably 1.5 μm or less.

Herein, the average particle size can be measured as D50 using, for example, a laser diffraction particle size distribution measuring device (LA950 available from HORIBA). D50 refers to a median particle size (50% point) of a volume-based cumulative distribution. It is a particle size that splits the distribution of particles with half above and half below this diameter. Specifically, D50 is determined by the following method.

(D50 Measurement Method)

A sample (sample powder) (0.1 g) is mixed with a 0.025 wt % aqueous solution of sodium hexametaphosphate (60 mL). The mixture is dispersed using an ultrasonic homogenizer (US-600 available from Nissei Corporation) at V-level 3 for two minutes. Thus, a sample suspension is prepared. Subsequently, a 0.025 wt % aqueous solution of sodium hexametaphosphate is circulated through a sample circulator, and the suspension is dropped thereto such that the transmittance is 80 to 95%. The mixture is ultrasonically dispersed at a circulation speed of 5 and a stirring speed of 1 for 60 seconds. Then, the measurement is performed.

The specific surface area (also referred to as "SSA") of the hydrotalcite powder is preferably 1 $m^2/g$ or more and 50 $m^2/g$ or less, for example. This improves the dispersibility of the hydrotalcite powder in the chlorine-containing resin, further improving the effects of the present invention. The specific surface area is more preferably 5 $m^2/g$ or more, still more preferably 10 $m^2/g$ or more. At the same time, the specific surface area is more preferably 40 $m^2/g$ or less, still more preferably 30 $m^2/g$ or less.

Herein, the specific surface area refers to the BET specific surface area (also referred to as "SSA") determined by the BET method. The BET method is a gas adsorption method in which gaseous particles such as nitrogen are adsorbed onto solid particles, and the specific surface area is measured from the amount of the gaseous particles adsorbed. The specific surface area is determined by calculating the molar volume of the adsorbate VM by the BET method from the relationship between the pressure P and the adsorption volume V.

Specifically, the BET specific surface area is determined under the following conditions.

(Specific Surface Area Measuring Conditions)

Device used: Macsorb Model HM-1220 available from Mountech Co., Ltd.

Atmosphere: Nitrogen gas ($N_2$)

Degassing conditions of external degasser: 105° C. for 15 minutes

Degassing conditions of specific surface area measuring device: 105° C. for 5 minutes Particles of the hydrotalcite powder may each have a coating layer. In this case, the hydrotalcite powder containing such particles each having a coating layer preferably has physical properties that satisfy the above-described physical properties (such as particle shape, average particle size, and specific surface area). The coating layer is not particularly limited. Yet, a coating layer obtained by surface treatment using a surface treatment agent is preferred.

The surface treatment agent is not particularly limited. Examples include coupling agents such as higher fatty acids, metal salts of higher fatty acids (metal soap), anionic surfactants, phosphate esters, silane coupling agents, titanium coupling agents, and aluminum coupling agents. These may be used alone or in combination of two or more thereof.

More specific examples of the surface treatment agent include higher fatty acids such as stearic acid, oleic acid, erucic acid, palmitic acid, and lauric acid, and metal salts of these higher fatty acids, such as lithium salt, sodium salt, and potassium salt; sulfuric acid ester salts of higher alcohols such as stearyl alcohol and oleyl alcohol, sulfuric acid ester salts of polyethylene glycol ether, amide-bonded sulfuric acid ester salt, and ether-bonded sulfonate; anionic surfactants such as ester-bonded sulfonate, amide-bonded alkylaryl sulfonate, and ether-bonded alkylaryl sulfonate; phosphate esters such as acid or alkali metal salts or amine salts of monoesters or diesters of orthophosphoric acid with an alcohol such as oleyl alcohol or stearyl alcohol, or mixtures of these monoesters and diesters; silane coupling agents such as vinyl ethoxysilane, γ-methacryloxypropyltrimethoxysilane, vinyltris(2-methoxyethoxy)silane, and γ-aminopropyltrimethoxysilane; titanium coupling agents such as isopropyl triisostearoyl titanate, isopropyl tris(dioctylpyrophosphate)titanate, and isopropyl tridecylbenzenesulfonyl titanate; and alkaline coupling agents such as acetoalkoxyaluminum diisopropylate.

The amount of the surface treatment agent is not particularly limited. Yet, the amount of the surface treatment agent is preferably adjusted such that the coating amount of the surface treatment agent is in the range of 0.1 to 30% by mass relative to 100% by mass of the hydrotalcite powder as the final product which contains particles each having a coating layer. The amount is more preferably in the range of 0.1 to 20% by mass.

In the resin composition, the amount of the hydrotalcite powder is preferably 0.05 parts by mass or more and is also preferably 10 parts by mass or less relative to 100 parts by mass of the chlorine-containing resin, for example. This enhances heat resistance and thermal stability. The amount is more preferably 0.1 parts by mass or more and is also more preferably 8 parts by mass or less, still more preferably 5 parts by mass or less.

Organic Acid Zinc

The resin composition of the present invention also contains organic acid zinc. The presence of organic acid zinc stabilizes chlorine in the chlorine-containing resin, and prevents discoloration during processing or use. Thus, a processed product can be obtained without degrading its appearance.

The organic acid to form the organic acid zinc is not particularly limited. Examples include organic monocarboxylic acids such as acetic acid, propionic acid, butyric acid, valeric acid, caproic acid, enanthic acid, caprylic acid, pelargonic acid, 2-ethylhexyl acid, neodecanoic acid, capric acid, undecanoic acid, lauric acid, tridecanoic acid, myristic acid, palmitic acid, isostearic acid, stearic acid, 12-hydroxystearic acid, behenic acid, montanic acid, benzoic acid, monochlorobenzoic acid, p-t-butylbenzoic acid, dimethylhydroxybenzoic acid, 3,5-di-t-butyl-4-hydroxybenzoic acid, toluic acid, dimethylbenzoic acid, ethylbenzoic acid, cuminic acid, n-propylbenzoic acid, aminobenzoic acid, N,N-dimethylaminobenzoicacid, acetoxybenzoicacid, salicylic acid, p-t-octylsalicylic acid, elaidic acid, oleic acid, linoleic acid, linolenic acid, thioglycolic acid, mercaptopropionic acid, and octylmercaptopropionic acid; organic dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, methaconic acid, itaconic acid, aconitic acid, and thiodipropionic acid; and monoesters or monoamides of organic dicarboxylic acids, and di- or tri-esters of organic tri- or tetracarboxylic acids such as butanetricarboxylic acid, butanetetracarboxylic acid, hemimellitic acid, trimellitic acid, mellophanic acid, and pyromellitic acid. One or more of hydrogen atoms constituting these organic acids may be replaced by hydroxy groups or the like.

In particular, C12-C20 higher fatty acids are preferred. Specifically, for example, zinc salts of myristic acid, palmitic acid, isostearic acid, and stearic acid, which provide adequate lubricity and are compatible with the chlorine-containing resin, are preferred. In particular, zinc salts such as zinc palmitate and zinc stearate are preferably used because they are inexpensive and easily available.

As is the case with zinc dehydroacetate (described later), a compound that corresponds to both organic acid zinc and a β-diketone compound is categorized as a β-diketone compound in the present invention. In other words, the organic acid zinc is a zinc salt of an organic acid, and it does not correspond to a β-diketone compound.

The amount of the organic acid zinc is not particularly limited. For example, the amount is preferably 0.01 parts by mass or more relative to 100 parts by mass of the chlorine-containing resin. This can prevent discoloration. The amount is more preferably 0.1 parts by mass or more, and is preferably 5 parts by mass or less. This can enhance heat resistance and provide a better color tone, without further degrading the appearance of the resulting product. The amount is more preferably 2 parts by mass or less.

Filler

Preferably, the resin composition of the present invention also contains a filler. This improves the dimensional stability and strength of the resulting article. The resulting resin composition is suitable for processed products. The filler also serves as a neutralizer.

The filler is not particularly limited. Any of inorganic salts, inorganic oxide particles, inorganic hydroxide particles, and like other inorganic powders can be used. Examples include salts, oxides, hydroxides, and composite oxides of zinc, titanium, iron, cerium, barium, calcium, silicon, aluminum, magnesium, strontium, boron, and zirconium. The salts are not particularly limited. Examples include sulfate, carbonate, chloride, acetate, and nitrate. Specific examples include calcium carbonate, zinc carbonate, magnesium carbonate, silica, zinc oxide, titanium oxide, cerium oxide, iron oxide, barium sulfate, strontium sulfate, magnesium sulfate, silicon oxide, aluminum oxide, magnesium oxide, zinc silicate, zinc titanate, barium titanate, clay, and talc. Calcium carbonate is preferred among these.

Calcium carbonate is preferably one having a specific surface area (BET specific surface area) of 23 $m^2/g$ or less. The BET specific surface area is more preferably 20 $m^2/g$ or less, still more preferably 18 $m^2/g$ or less. The lower limit is preferably at least 0.1 $m^2/g$, more preferably at least 5 $m^2/g$.

The amount of the filler when contained in the resin composition is not particularly limited. For example, the amount is preferably 40 parts by mass or less relative to 100 parts by mass of the chlorine-containing resin. If the amount exceeds 40 parts by mass, plate-out may not be prevented. The amount is more preferably 30 parts by mass or less, still more preferably 1 to 30 parts by mass. The amount is still more preferably 25 parts by mass or less, yet still more preferably 20 parts by mass or less, particularly preferably 10 parts by mass or less. The lower limit is preferably at least 1 part by mass, more preferably at least 2 parts by mass, still more preferably at least 3 parts by mass. Most preferably, calcium carbonate having a specific surface area of 20 $m^2/g$ or less is contained in an amount in one of these preferred ranges.

β-Diketone Compound

Preferably, the resin composition of the present invention also contains a β-diketone compound. The presence of the β-diketone compound can improve colorability during molding (processing).

The β-diketone compound is not particularly limited. Preferred examples include alkanoylaroylmethane and diaroylmethane such as stearoylacetylmethane, benzoylacetylmethane, dibenzoylmethane, stearoylbenzoylmethane, octylbenzoylmethane, bis(4-octylbenzoyl)methane, 4-methoxybenzoylbenzoylmethane, bis(4-carboxymethylbenzoyl)methane, 2-carboxymethylbenzoylacetyloctylmethane, and 2-benzoylcyclohexane; dehydroacetic acid; and metal salts of these.

In the case when the chlorine-containing resin composition is used as an electric wire coating material, the chlorine-containing resin composition preferably contains zinc dehydroacetate. In the resin additives industry, zinc dehydroacetate is recognized as a metal salt of a β-diketone compound, and is thus similarly treated in the present application.

The amount of the β-diketone compound when contained in the resin composition is not particularly limited. For example, the amount is preferably 2 parts by mass or less relative to 100 parts by mass of the chlorine-containing resin. The amount is more preferably 0.1 to 1 part by mass.

Wax

For controlling the kneading state of resin during processing and for adjusting the appearance (such as luster) of the resulting article, for example, the resin composition of the present invention may also contain, if necessary, a hydrocarbon wax (such as a polyethylene wax or a paraffin wax) and/or a fatty acid ester wax. Specific examples of the polyethylene wax include HI-WAX series available from Mitsui Chemicals, Inc., SANWAX series available from Sanyo Chemical Industries, Ltd., VISCOL series available from Sanyo Chemical Industries, Ltd., and LUVAX series available from Nippon Seiro Co., Ltd. Examples of the ester wax include Rikester series available from Riken Vitamin Co., Ltd., and LOXIOL series available from Emery Oleochemicals.

Additional Components

The resin composition of the present invention may further contain additional components, if necessary. Examples include various additives such as heat resistance aids, lubricants other than the wax mentioned above (e.g., internal lubricants such as fatty acid monoglyceride), ultraviolet light absorbers, antioxidants, crosslinking aids, and plasticizers. These additives are each not particularly limited. For example, the heat resistance aids include polyhydric alcohol compounds such as dipentaerythritol and epoxy compounds such as epoxy resin; the lubricants include monoglyceride stearate, monoglyceride palmitate, stearic acid, and palmitic acid; the crosslinking aids include trimethylolpropane trimethacrylate and dipentaerythritol hexaacrylate; and the plasticizers include dioctylphthalate (DOP), trioctyltrimellitate (TOTM), dioctyl adipate (DOA), diisononyl phthalate (DINP), and diisodecyl phthalate (DIDP).

Chlorine-containing resin composition for electric wire

Electric wires and harnesses obtained by coating copper wires with a chlorine-containing resin composition may be subjected to time-dependent changes in color and quality of the copper wire surface (which is also referred to as "discoloration of copper wire surface"). As one possible cause, the copper wire surface may be affected by an organic compound, particularly dibenzoylmethane, contained in the chlorine-containing resin composition. In other words, plated-out materials resulting from processing of electric wires using a chlorine-containing resin composition containing dibenzoylmethane sometimes contain a large amount of dibenzoylmethane, which presumably causes greater changes in color and quality of the copper wire surface.

Since the resin composition of the present invention enables plate-out prevention during processing, the resin composition when used for electric wires reduces attachment of components to copper wires in the electric wires. Thus, the resin composition is expected to reduce changes in color and quality of the copper wire surface. Due to the absence of dibenzoylmethane and the presence of stearoylbenzoylmethane or zinc dehydroacetate, the resin composition can produce electric wires in which changes in colors and quality of the copper wire surface are further reduced.

(Production Method)

The method for producing the chlorine-containing resin composition of the present invention is not particularly limited, as long as the method includes mixing a chlorine-containing resin, a hydrotalcite powder, organic acid zinc, and optional components that are added if necessary. The mixing method is also not particularly limited. For example, preferably, a Henschel mixer or a super mixer is used for mixing, and the resultant mixture is kneaded uniformly using a device such as a roller, a Banbury mixer, or an extruder.

(Use)

The chlorine-containing resin composition of the present invention can provide a processed product that is excellent in thermal stability and heat resistance and that has various excellent properties derived from the chlorine-containing resin without degrading the appearance of the processed product. The chlorine-containing resin composition also enables sufficient plate-out prevention during processing. Thus, the resin composition is particularly useful for the processed product. Such a processed product formed from the chlorine-containing resin composition is also one of preferred embodiments contemplated by the present inventors.

The processed product may be in any form, such as sheet, film, string, plate, bar, pellet, or tube form. Specific preferred examples of the processed product include various films such as agricultural films, electric wires, pipes, and resin window frames.

The processing method is not particularly limited. Examples include extrusion, injection molding, roll forming, dip molding, and blow molding. The processed product is preferably an extruded product (extrudate). The extrusion (extrusion molding) is preferably accomplished by an extruder. Such a method for producing a processed product, which includes a step of extruding the chlorine-containing resin composition of the present invention by an extruder, is also encompassed by the present invention. This method enables production of a processed product having various excellent properties in an efficient, easy, simple, and high-yield manner.

Among extrudates, the production method is particularly effective in processing of products called profile extrudates (such as window frames) that have particularly complicated shapes and that are difficult to produce. Dies for use in profile extrusion have complicated shapes, and plate-out thus easily occurs. As a result, the incidence of defective processed products is generally high, and resin is susceptible to discoloration and/or degradation during processing. Thus, use of the present invention is promising in increasing the extrudate yield. An embodiment of the production method of the present invention, which is a method for producing a profile extrudate, is one of preferred embodiments of the present invention.

In the case of extrusion, an increase in frequency of use of a die is known to cause various defects due to degradation of portions where the die contacts resin. For example, red streaks may occur when a die is used at 160° C. to 220° C. for a cumulative time of 3000 hours or longer. Use of the present invention is promising in preventing the occurrence of such red streaks.

EXAMPLES

The present invention is described in detail with reference to examples below, but the present invention is not limited to these examples.

1. Raw Materials

Raw materials in Tables 1 to 4 (described later) are as follows.

(1) Chlorine-Containing Resin

Vinylchloride resin: TK-1000 available from Shin-Etsu Chemical Co., Ltd., polymerization degree: 1100

(2) Hydrotalcite Powder

According to the production operation of a hydrotalcite described in Example 4 of Japanese Patent No. 5056014, hydrotalcite powders were synthesized by changing the molar ratio of magnesium sulfate, aluminum sulfate, and zinc sulfate under various production conditions. The oil absorption and the specific surface area were measured at each production by the later-described methods, and the hydrotalcite powders in Tables 1 to 4 were selected. Some of the hydrotalcite powders were measured for D50 average particle size by the D50 average particle size measurement method. Table 1 shows the measurement results. In Table 1, one described with "Mg/Al=2.0" is a hydrotalcite powder containing Mg and Al and not containing Zn, and one described with "(Mg+Zn)/Al=2.0" is a hydrotalcite powder containing Mg, Zn, and Al.

(3) Organic Acid Zinc

Zinc stearate: SZ-P available from Sakai Chemical Industry Co., Ltd.

(4) Additional Components

Calcium carbonate: μ-Powder 3S available from Shiraishi Calcium Kaisha, Ltd., specific surface area: 8.5 m$^2$/g Dibenzoylmethane: β-diketone compound, Rhodiastab 83P, available from Rhodia Chimie SAS Stearoylbenzoylmethane: β-diketone compound, Rhodiastab 50, available from Rhodia Chimie SAS Polyethylene wax: HI-WAX 220MP available from Mitsui Chemicals, Inc.

Ester wax: Rikester SL-02 available from Riken Vitamin Co., Ltd.

Calcium stearate: SC-P available from Sakai Chemical Industry Co., Ltd.

Dipentaerythritol: Dipentarit 300 available from Koei Chemical Co., Ltd.

Monoglyceride stearate: Rikemal S-100 available from Riken Vitamin Co., Ltd.

Phenolic antioxidant: Irganox 1010 available from Ciba-Geigy Stearic acid: stearic acid powder, Sakura, available from NOF Corporation Plasticizer (dioctylphthalate): DOP available from J-Plus Co., Ltd.

2. Resin Composition

Other materials were weighed in ratios shown in Tables 1 to 4 relative to 3 kg of the chlorine-containing resin. The weighed materials were mixed using a 20-L Henschel mixer (Nippon Coke & Engineering, Co., Ltd.) until the temperature of the mixture reached 100° C. Thus, a resin composition was prepared.

For example, in Test Example A1, 3 kg of vinyl chloride resin, 30 g of hydrotalcite powder, 150 g of calcium carbonate, 15 g of calcium stearate, 30 g of zinc stearate, 15 g of dipentaerythritol, 15 g of dibenzoylmethane, 15 g of polyethylene wax, and 15 g of ester wax were weighed and fed into a Henschel mixer. These components were mixed at a Henschel mixer blade rotation speed of 2000 rpm. When the temperature of the mixture reached 100° C., the mixture was taken out from the Henschel mixer.

3. Processing

The resin composition was processed in a lab extruder (conical twin-screw "2D20C" available from Toyo Seiki Seisaku-sho, Ltd.; extrusion conditions: 175° C. for C1, 180° C. for C2, 185° C. for C3, 185° C. for AD, 180° C. for D1, and 205° C. for D2; die: for pipes) including a suction cooling device with cooling function (a device that smoothens the surface of an article) for five hours. Thus, pipes were obtained.

4. Evaluation Tests

In each test example, various physical properties and the like were evaluated by the following methods. Tables 1 to 4 show the results.

(1) Plate-Out

During and after processing of the pipes in "3. Processing" above, the occurrence of plate-out on the die and the cooling mold (i.e., the occurrence of deposit on the die and the cooling mold) was visually observed and evaluated based on the following criteria.

AA: No deposit was found on the die or the cooling mold.
A: No deposit was found during processing, but a small amount of deposit was found on the die and the cooling mold after processing.
B: Deposit was found on the die and the cooling mold during processing, but the resulting pipe had no defects.
F: Deposit was found on the entire die surface and the entire cooling mold surface during processing, and the deposit separated from the die or the cooling mold was attached to the resulting pipe.

(2) Color Tone of Article

In "3. Processing" above, a preform pipe immediately after processing had started and a pipe immediately after processing had finished were picked out, and each pipe was cut to a length of 10 mm to obtain a test piece. Each test piece was pressed under heat for three minutes using a pressing machine set at 160° C., and then cooled to produce a 1-mm-thick sheet. The preform pipe immediately after processing had started and the pipe immediately after processing had finished were subjected to color difference measurement using a colorimeter (simultaneous photometric and spectroscopic colorimeter "SQ-2000" available from Nippon Denshoku Industries, Co., Ltd.) to determine the ΔYI value.

XYZ values of the standard white plate were as follows: X: 79.04; Y: 81.79; and Z: 93.84. If the value ΔYI is 10 or less, coloring problems are less likely to occur in the pipe production process. If the value ΔYI is more than 10, it is considered to be a level of coloring at which the incidence of defective products may increase in the production process.

(3) Heat Resistance (Oven Heat Resistance and Press Heat Resistance) and Transparency The pipe (100 g) obtained in "3. Processing" above was crushed by a crusher, and the crushed pieces were kneaded for five minutes using an 8-inch roller (Kansai Roll Co., Ltd.) having a roll surface temperature of 180° C. Thus, a 0.3-mm-thick sheet was produced. The sheet was subjected to the following tests.

(3-1) Oven Heat Resistance

The sheet produced above was placed in a 180° C. gear oven available from ESPEC CORP. and stored therein for 30 minutes. The hue of the sheet before and after storage was measured by the colorimeter described above to determine the LE.

If the ΔE is 15 or less, the color tone is considered to be good, and problems are less likely to occur. If the ΔE is more than 15, trouble such as malfunction of a processing machine or the like may occur.

(3-2) Press Heat Resistance

A stack of 13 sheets was prepared and pressed at 100 kg/cm$^2$ for 20 minutes to obtain a 3-mm-thick sheet, using a pressing machine (Toyoseiki Mini Test Press-10) having a press surface temperature of 190° C. The color difference of the sheet before and after pressing was measured by the colorimeter described above to determine the ΔE based on the following criteria.

If the ΔE is 10 or less, the color tone is considered to be good, and problems are less likely to occur. If the ΔE is more than 10, trouble such as malfunction of a processing machine or the like may occur.

(3-3) Transparency

Among the sheets above, a 1-mm-thick press sheet produced with the composition shown in Table 4 was subjected to haze value measurement using a haze meter (available from Nippon Denshoku Industries, Co., Ltd.).

A smaller haze value indicates higher transparency. Generally, when the haze value exceeds 26, a 1-mm-thick sheet is no longer see-through, i.e., the sheet is opaque.

(4) Test for Discoloration of Copper Wire Surface

A resin composition produced using the materials in Table 5 under the production conditions for "2. Resin composition" above was kneaded for five minutes using an 8-inch roller (Kansai Roll Co., Ltd.) having a roll surface temperature of 160° C. Thus, a 0.6-mm-thick rolled sheet was produced. A stack of two sheets was placed on each side of a copper plate (thickness: 0.2 mm) available from Misumi-VONA. The resulting stack was pressed at 100 kg/cm² for five minutes by a pressing machine (Toyoseiki Mini Test Press-10) having a press surface temperature of 170° C. Thus, a sheet with a copper plate was obtained. Next, the sheet with a copper plate was stored in a thermohygrostat chamber (ESPEC) at 50° C. and a humidity of 90% for 168 hours. Then, the sheet with a copper plate was taken out, and the copper plate was separated from the sheets. The state of the contact surface was determined based on the following criteria.

A: The color remained the same before and after aging.
B: Slight discoloration was observed after aging.
F: Significant discoloration was observed after aging.

When the degree of discoloration was not significant, or when the discoloration was significant but uneven, it was indicated by F,B.

TABLE 1

| | | Test Example A1 | Test Example A2 | Test Example A3 | Test Example A4 | Test Example A5 |
|---|---|---|---|---|---|---|
| Chlorine-containing resin | TK-1000 | 100 | 100 | 100 | 100 | 100 |
| Hydrotalcite powder | Oil absorption: 23 ml/100 g (Mg/Al = 2.0) D50 = 1.0 μm | 1 | — | — | — | — |
| | Oil absorption: 30 ml/100 g (Mg/Al = 2.0) D50 = 0.8 μm | — | 1 | — | — | — |
| | Oil absorption: 40 ml/100 g (Mg/Al = 2.0) D50 = 0.5 μm | — | — | 1 | — | — |
| | Oil absorption: 49 ml/100 g (Mg/Al = 2.0) D50 = 0.4 μm | — | — | — | 1 | — |
| | Oil absorption: 58 ml/100 g (Mg/Al = 2.0) D50 = 0.5 μm | — | — | — | — | 1 |
| Organic acid zinc | Zinc stearate | 1 | 1 | 1 | 1 | 1 |
| Additional components | Calcium carbonate | 5 | 5 | 5 | 5 | 5 |
| | Dibenzoylmethane | 0.5 | 0.5 | 0.5 | 0.5 | 0.5 |
| | Polyethylene wax | 0.5 | 0.5 | 0.5 | 0.5 | 0.5 |
| | Ester wax | 0.5 | 0.5 | 0.5 | 0.5 | 0.5 |
| | Calcium stearate | 0.5 | 0.5 | 0.5 | 0.5 | 0.5 |
| | Dipentaerythritol | 0.5 | 0.5 | 0.5 | 0.5 | 0.5 |
| Plate-out evaluation | | AA | AA | B | B | F |

In the tests in Table 1, hydrotalcite powders each having the same molar ratio of the metal elements but different oil absorption were used.

TABLE 2

| | | Test Example B1 | Test Example B2 | Test Example B3 | Test Example B4 | Test Example B5 | Test Example B6 | Test Example B7 | Test Example B8 | Test Example B9 |
|---|---|---|---|---|---|---|---|---|---|---|
| Chlorine-containing resin | TK-1000 | 100 | 100 | 100 | 100 | 100 | 100 | 100 | 100 | 100 |
| Hydrotalcite powder | Oil absorption: 28 ml/100 g Mg/Al = 2.2 | 1 | — | — | — | — | — | — | — | — |
| | Oil absorption: 37 ml/100 g Mg/Al = 2.2 | — | 1 | — | — | — | — | — | — | — |
| | Oil absorption: 45 ml/100 g Mg/Al = 2.2 | — | — | 1 | — | — | — | — | — | — |
| | Oil absorption: 51 ml/100 g Mg/Al = 2.4 | — | — | — | — | — | 1 | — | — | — |
| | Oil absorption: 55 ml/100 g Mg/Al = 3.0 | — | — | — | — | — | — | 1 | — | — |
| | Oil absorption: 30 ml/100 g Mg/Al = 2.4 | — | — | — | — | — | — | — | 1 | — |
| | Oil absorption: 28 ml/100 g (Mg + Zn)/Al = 2.2 *1 | — | — | — | 1 | — | — | — | — | — |
| | Oil absorption: 22 ml/100 g (Mg + Zn)/Al = 2.0 *2 | — | — | — | — | 1 | — | — | — | — |
| | Oil absorption: 35 ml/100 g (Mg + Zn)/Al = 2.0 *2 | — | — | — | — | — | — | — | — | 1 |
| Organic acid zinc | Zinc stearate | 1 | 1 | 1 | 1 | 1 | 1 | 1 | 1 | 1 |
| Additional components | Calcium carbonate | 5 | 5 | 5 | 5 | 5 | 5 | 5 | 5 | 5 |
| | Dibenzoyl-methane | 0.5 | 0.5 | 0.5 | 0.5 | 0.5 | 0.5 | 0.5 | 0.5 | 0.5 |
| | Polyethylene wax | 0.5 | 0.5 | 0.5 | 0.5 | 0.5 | 0.5 | 0.5 | 0.5 | 0.5 |
| | Ester wax | 0.5 | 0.5 | 0.5 | 0.5 | 0.5 | 0.5 | 0.5 | 0.5 | 0.5 |
| | Calcium stearate | 0.5 | 0.5 | 0.5 | 0.5 | 0.5 | 0.5 | 0.5 | 0.5 | 0.5 |
| | Dipentaerythritol | 0.5 | 0.5 | 0.5 | 0.5 | 0.5 | 0.5 | 0.5 | 0.5 | 0.5 |
| Heat resistance | Oven heat resistance evaluation ($\Delta E$) | 10 | 12 | 12 | 8 | 8 | 18 | 23 | 17 | 8 |
| | Press coloration evaluation ($\Delta E$) | 8 | 8 | 8 | 6 | 5 | 18 | 22 | 22 | 6 |
| Extrusion evaluation | Article color tone evaluation ($\Delta YI$) | 8 | 8 | 8 | 6 | 6 | 20 | 25 | 21 | 6 |
| | Plate-out evaluation | AA | B | B | AA | AA | F | F | A | A |

*1: Mg = 0.60, Zn = 0.09, Al = 0.31

*2: Mg = 0.58, Zn = 0.09, Al = 0.33

In the tests in Table 2, hydrotalcite powders each having a different molar ratio of the metal elements and/or different oil absorption were used.

TABLE 3

|  |  | Test Example C1 | Test Example C2 | Test Example C3 | Test Example C4 |
|---|---|---|---|---|---|
| Chlorine-containing resin | TK-1000 | 100 | 100 | 100 | 100 |
| Hydrotalcite powder | Oil absorption: 30 ml/100 g (Mg/Al = 1.9) | 1 | — | — | — |
|  | Oil absorption: 30 ml/100 g (Mg/Al = 2.0) | — | 1 | — | — |
|  | Oil absorption: 30 ml/100 g (Mg/Al = 2.4) | — | — | 1 | — |
|  | Oil absorption: 51 ml/100 g (Mg/Al = 2.0) | — | — | — | 1 |
| Organic acid zinc | Zinc stearate | 1 | 1 | 1 | 1 |
| Additional components | Stearoylbenzoylmethane | 0.5 | 0.5 | 0.5 | 0.5 |
|  | Calcium stearate | 0.5 | 0.5 | 0.5 | 0.5 |
|  | Phenolic antioxidant | 0.1 | 0.1 | 0.1 | 0.1 |
|  | Stearic acid | 0.5 | 0.5 | 0.5 | 0.5 |
|  | Monoglyceride stearate | 0.5 | 0.5 | 0.5 | 0.5 |
| Extrusion evaluation | Plate-out evaluation | A | A | A | F |
|  | Article color tone evaluation (ΔYI) | 5 | 5 | 21 | 18 |

In the tests in Table 3, hydrotalcite powders each having a different molar ratio of the metal elements and/or different oil absorption were used. The hydrotalcite powders suitably contained additional components different from those in Table 2.

TABLE 4

|  |  | Test Example D1 | Test Example D2 | Test Example D3 | Test Example D4 | Test Example D5 |
|---|---|---|---|---|---|---|
| Chlorine-containing resin | TK-1000 | 100 | 100 | 100 | 100 | 100 |
| Plasticizer | DOP | 35 | 35 | 35 | 35 | 35 |
| Hydrotalcite powder | Oil absorption: 30 ml/100 g (Mg/Al = 1.9) | 2 | — | — | — | — |
|  | Oil absorption: 30 ml/100 g (Mg/Al = 2.0) | — | 2 | — | — | — |
|  | Oil absorption: 30 ml/100 g (Mg/Al = 2.4) | — | — | 2 | — | — |
|  | Oil absorption: 51 ml/100 g (Mg/Al = 2.0) | — | — | — | 2 | — |
|  | Oil absorption: 45 ml/100 g (Mg/Al = 2.5) | — | — | — | — | 2 |
| Organic acid zinc | Zinc stearate | 1 | 1 | 1 | 1 | 1 |
| Additional components | Stearoyl-benzoyl-methane | 0.5 | 0.5 | 0.5 | 0.5 | 0.5 |
|  | Phenolic antioxidant | 0.1 | 0.1 | 0.1 | 0.1 | 0.1 |
| Extrusion evaluation | Plate-out evaluation | A | A | A | F | B |
|  | Article color tone evaluation (ΔYI) | 3 | 3 | 15 | 15 | 15 |
| Transparency evaluation (HAZE) |  | 23 | 12 | 13 | 36 | 32 |

In the tests in Table 4, a plasticizer was used.

TABLE 5

|  |  | Test Example E1 | Test Example E2 | Test Example E3 | Test Example E4 | Test Example E5 | Test Example E6 | Test Example E7 | Test Example E8 | Test Example E9 | Test Example E10 |
|---|---|---|---|---|---|---|---|---|---|---|---|
| Chlorine-containing resin | TK-1000 | 100 | 100 | 100 | 100 | 100 | 100 | 100 | 100 | 100 | 100 |
| Plasticizer | TOTM | 50 | 50 | 50 | 50 | 50 | 50 | 50 | 50 | 50 | 50 |
| Hydrotalcite powder | Oil absorption: 51 ml/100 g (Mg/Al = 2.0) | 2 | 2 | 2 | 2 | 2 | — | — | — | — | — |
|  | Oil absorption: 23 ml/100 g (Mg/Al = 2.0) | — | — | — | — | — | 2 | 2 | 2 | 2 | 2 |
| Additional components 1 | Dibenzoylmethane | 0.5 | — | — | — | — | 0.5 | — | — | — | — |
|  | Stearoylbenzoylmethane | — | 0.5 | — | — | — | — | 0.5 | — | — | — |
|  | Dehydroacetic acid | — | — | — | 0.5 | — | — | — | — | 0.5 | — |
|  | Zinc acetylacetonate | — | — | — | — | 0.5 | — | — | — | — | 0.5 |
|  | Zinc dehydroacetate | — | — | 0.5 | — | — | — | — | 0.5 | — | — |
| Organic acid zinc | Zinc stearate | 1 | 1 | 1 | 1 | 1 | 1 | 1 | 1 | 1 | 1 |
| Additional components 2 | Calcium carbonate | 10 | 10 | 10 | 10 | 10 | 10 | 10 | 10 | 10 | 10 |
|  | Calcium stearate | 0.5 | 0.5 | 0.5 | 0.5 | 0.5 | 0.5 | 0.5 | 0.5 | 0.5 | 0.5 |
| Test for discoloration of copper wire surface |  | F | F | F | F | F | F, B | A | A | B | B |

In Table 5, the resin compositions were evaluated as electric wire coating materials.

The results of all the test examples described above show that with the use of the resin composition containing a chlorine-containing resin, a hydrotalcite powder, and organic acid zinc, wherein the hydrotalcite powder has a ratio of the specific elements ((Mg+Zn)/Al) of 2.20 or less and an oil absorption of 50 ml/100 g or less, it is possible to sufficiently prevent the occurrence of plate-out during processing and the time-dependent increase in the amount of deposit, and it is possible to obtain a processed product excellent in thermal stability and heat resistance and having a good color tone and transparency. In this regard, for example, Test Examples A1 to A4 are different from Test Example A5 mainly in whether the oil absorption of the hydrotalcite powder is 50 ml/100 g or less. In Test Example A5 in which the oil absorption is outside the range, the result of the plate-out evaluation is significantly poor (see Table 1). The cause is unknown, but the poor result is presumably attributable to the fact that the lubricant that has dissolved and became liquid during processing was not easily absorbed into the hydrotalcite powder. Yet, it was also found that even when the oil absorption of the hydrotalcite powder is in the above range defined in the present invention, when the ratio of the specific elements ((Mg+Zn)/Al) exceeds 2.20, the resin composition does not enhance the heat resistance or the color tone of the resulting article (see Table 2). Thus, it was found that the oil absorption of the hydrotalcite powder and the ratio of the specific elements ((Mg+Zn)/Al) are both important to achieve the effects of the present invention, and that the effects of the present invention are achieved by synergy of these features. The soft resin compositions containing a plasticizer showed almost the same tendencies (see Table 4).

In addition, the results of Test Examples E1 to E10 show that when the hydrotalcite powder has an oil absorption of 50 ml/100 g or less and stearoylbenzoylmethane or zinc dehydroacetate is contained, it is possible to obtain a composition that has an excellent effect to prevent discoloration of copper wire surface and that is suitable as an electric wire coating material (Table 5).

The invention claimed is:

1. A chlorine-containing resin composition comprising:
a chlorine-containing resin;
a hydrotalcite powder;
organic acid zinc;
a plasticizer; and
stearoylbenzoylmethane or zinc dehydroacetate,
  wherein the resin composition does not contain dibenzoylmethane,
  the hydrotalcite powder contains magnesium (Mg) and/or zinc (Zn), and aluminum (Al),
  the molar ratio of the total amount of magnesium and zinc to the amount of aluminum ((Mg+Zn)/Al) is 2.20 or less, and
  the hydrotalcite powder has an oil absorption of 30 ml/100 g or less.

2. A chlorine-containing resin composition comprising:
a chlorine-containing resin;
a hydrotalcite powder; and
organic acid zinc,
wherein the hydrotalcite powder contains magnesium (Mg), zinc (Zn), and aluminum (Al),
the molar ratio of the total amount of magnesium and zinc to the amount of aluminum ((Mg+Zn)/Al) is 2.20 or less, and
the hydrotalcite powder has an oil absorption of 50 ml/100 g or less.

3. The chlorine-containing resin composition according to claim 1, wherein the chlorine-containing resin composition contains 0.05 to 5 parts by mass of the hydrotalcite powder and 0.01 to 2 parts by mass of the organic acid zinc, relative to 100 parts by mass of the chlorine-containing resin.

4. The chlorine-containing resin composition according to claim 1, wherein the hydrotalcite powder is represented by the following formula (1):

$$\{(Mg)_x(Zn)_y\}(Al)_z(OH)_2(A^{n-})_{z/n} \cdot mH_2O \tag{1}$$

wherein $A^{n-}$ represents an n-valent interlayer anion; x, y, and z are numbers that satisfy $0<x<1$, $0 \leq y<1$, $0.2 \leq z \leq 0.4$, and $x+y+z=1$; the ratio of x+y to z, i.e., $(x+y)/z$, is 2.20 or less; and n and m are numbers that satisfy $1 \leq n \leq 4$ and $0 \leq m$, respectively.

5. A method for producing a processed product, comprising:
a step of extruding the chlorine-containing resin composition according to claim 1 by an extruder.

* * * * *